(12) United States Patent
Lee

(10) Patent No.: US 10,373,005 B2
(45) Date of Patent: Aug. 6, 2019

(54) DRIVER MONITORING APPARATUS AND METHOD FOR CONTROLLING ILLUMINATOR THEREOF

(71) Applicant: HYUNDAI MOTOR COMPANY, Seoul (KR)

(72) Inventor: Seok Beom Lee, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 368 days.

(21) Appl. No.: 14/921,784

(22) Filed: Oct. 23, 2015

(65) Prior Publication Data

US 2016/0148065 A1 May 26, 2016

(30) Foreign Application Priority Data

Nov. 26, 2014 (KR) ........................ 10-2014-0166511

(51) Int. Cl.
 G06K 9/00 (2006.01)
 H04N 5/232 (2006.01)
 H04N 5/235 (2006.01)
 G06K 9/20 (2006.01)
(52) U.S. Cl.
 CPC ..... G06K 9/00845 (2013.01); G06K 9/00604 (2013.01); G06K 9/2027 (2013.01); H04N 5/2354 (2013.01); H04N 5/23219 (2013.01); H04N 5/23245 (2013.01)
(58) Field of Classification Search
 CPC ........... G06K 9/00845; G06K 9/00604; G06K 9/0207; H04N 5/23219; H04N 5/2354; H04N 5/23245
 See application file for complete search history.

(56) References Cited

U.S. PATENT DOCUMENTS

| 7,330,124 B2 | 2/2008 | Ota |
| 7,401,920 B1 | 7/2008 | Kranz et al. |
| 8,264,531 B2 | 9/2012 | Jung et al. |

(Continued)

FOREIGN PATENT DOCUMENTS

| CN | 101951828 A | 1/2011 |
| CN | 102510480 A | 6/2012 |

(Continued)

OTHER PUBLICATIONS

Notice of Allowance Korean Patent Application No. 10-2014-0166511 dated Mar. 31, 2016.

(Continued)

*Primary Examiner* — Joseph Suh
(74) *Attorney, Agent, or Firm* — Morgan, Lewis & Bockius LLP

(57) ABSTRACT

A driver monitoring apparatus includes: a driver monitoring camera configured to obtain an image of a user while adjusting an irradiation range of irradiated light; and a driver state sensor configured to request the driver monitoring camera to adjust the irradiation range depending on an operation mode. The driver monitoring apparatus is capable of improving reliability in monitoring a driver state by controlling an irradiation range and intensity of lighting depending on an operation mode and an external environment at the time of monitoring the driver state to irradiate light to only a region of interest.

9 Claims, 6 Drawing Sheets

(56) References Cited

U.S. PATENT DOCUMENTS

| | | | |
|---|---|---|---|
| 8,947,351 B1* | 2/2015 | Noble | G06F 3/0488 |
| | | | 345/156 |
| 2007/0171276 A1 | 7/2007 | Kim et al. | |
| 2008/0304011 A1 | 12/2008 | Ng et al. | |
| 2009/0016073 A1* | 1/2009 | Higgins-Luthman | |
| | | | B60Q 1/085 |
| | | | 362/465 |
| 2009/0251408 A1* | 10/2009 | Kuroda | G02F 1/133615 |
| | | | 345/156 |
| 2009/0264161 A1* | 10/2009 | Usher | H04M 1/22 |
| | | | 455/570 |
| 2010/0002075 A1 | 1/2010 | Jung et al. | |
| 2010/0066975 A1 | 3/2010 | Rehnstrom | |
| 2010/0182347 A1* | 7/2010 | Lin | H05B 41/282 |
| | | | 345/690 |
| 2010/0220892 A1 | 9/2010 | Kawakubo | |
| 2010/0303294 A1* | 12/2010 | Zschau | A61B 3/113 |
| | | | 382/103 |
| 2012/0074842 A1* | 3/2012 | Hattori | B60Q 1/1423 |
| | | | 315/77 |
| 2012/0147181 A1* | 6/2012 | Duner | G03B 17/02 |
| | | | 348/143 |
| 2012/0150387 A1 | 6/2012 | Watson et al. | |
| 2012/0161665 A1* | 6/2012 | Thornton | H05B 33/0854 |
| | | | 315/291 |
| 2013/0238186 A1* | 9/2013 | Aimura | B60Q 1/085 |
| | | | 701/36 |
| 2013/0285901 A1* | 10/2013 | Lee | G06F 3/013 |
| | | | 345/156 |
| 2014/0132485 A1* | 5/2014 | Kim | G02B 27/0172 |
| | | | 345/8 |
| 2014/0139631 A1* | 5/2014 | Mark | G06F 3/0304 |
| | | | 348/46 |
| 2014/0159887 A1* | 6/2014 | Piasecki | B60Q 1/00 |
| | | | 340/438 |
| 2014/0240363 A1* | 8/2014 | Hong | G06F 3/012 |
| | | | 345/684 |
| 2015/0278576 A1* | 10/2015 | Horesh | 382/103 |
| 2016/0005211 A1* | 1/2016 | Sarkis | G06T 19/00 |
| | | | 345/419 |
| 2016/0048735 A1* | 2/2016 | Ohya | G06K 9/0061 |
| | | | 348/78 |
| 2016/0209577 A1* | 7/2016 | Ford | G02B 6/0036 |
| 2018/0003990 A9* | 1/2018 | Bathiche | G06F 3/01 |

FOREIGN PATENT DOCUMENTS

| | | |
|---|---|---|
| CN | 103347446 A | 10/2013 |
| CN | 103594003 A | 2/2014 |
| CN | 103680058 A | 3/2014 |
| CN | 203480645 U | 3/2014 |
| EP | 2371271 A1 | 10/2011 |
| JP | 2005-091049 A | 4/2005 |
| JP | 2006-258836 A | 9/2006 |
| JP | 2007-168570 A | 7/2007 |
| JP | 2010-013090 A | 1/2010 |
| KR | 10-2003-0077127 A | 10/2003 |
| KR | 10-2007-0078225 A | 7/2007 |

OTHER PUBLICATIONS

Chinese Office Action dated Dec. 20, 2018 issued in Chinese Patent Application No. 201510765240.5 (with English translation).

* cited by examiner

DRIVER MONITORING APPARATUS AND METHOD FOR CONTROLLING ILLUMINATOR THEREOF

CROSS-REFERENCE TO RELATED APPLICATION

This application is based on and claims the benefit of priority to Korean Patent Application No. 10-2014-0166511, filed on Nov. 26, 2014 in the Korean Intellectual Property Office, the disclosure of which is incorporated herein in its entirety by reference.

TECHNICAL FIELD

The present disclosure relates to a driver monitoring apparatus and a method for controlling an illuminator thereof, and more particularly, to a driver monitoring apparatus capable of improving reliability in monitoring a driver state by controlling an irradiation range and intensity of lighting depending on an operation mode and an external environment at the time of monitoring the driver state to irradiate light to only a region of interest, and a method for controlling an illuminator thereof.

BACKGROUND

Generally, a driver monitoring apparatus photographs a driver that is driving a vehicle using a camera and decides a driving state (side glance, whether or not he/she drives the vehicle while being drowsy, a gaze point, or the like) of the driver through a photographed image of a face of the driver. In addition, the driver monitoring apparatus decides a driving state of the vehicle using a steering angle signal, a vehicle speed signal, and a driving position, and the like, of the vehicle that is being driven. In addition, the driver monitoring apparatus uses a driver state and the driving state to warn the driver that he/she is in an unstable driving state when he/she is in the unstable driving state, thereby making it possible to allow the driver to stably drive the vehicle. The driver monitoring apparatus includes an illuminator in order to smoothly photograph an image through the camera even at night or in an environment in which external light, or the like, is introduced.

Particularly, in the case in which lighting is irradiated over an entire region of the face when the driver monitoring apparatus tracks a gaze, a plurality of reflection points are formed by glasses, accessories, the face, and the like, and it is difficult to distinguish the plurality of reflection points and cornea reflection points from each other.

In addition, power of the illuminator needs to be increased in order to overcome the external light such as solar light, or the like. However, in this case, it is difficult to detect and track the face due to pixel saturation of a face region.

In a driver monitoring apparatus according to the related art, an angle and an irradiation angle of the illumination are fixed. Even in the case of using an illuminator that may be adjusted, the use of the illuminator is limited to the case in which a size of an irradiation region is constant and a specific region (for example, an eye region) in the face is tracked and is irradiated with light, as disclosed in EP 2371271 A1.

SUMMARY

The present disclosure has been made to solve the above-mentioned problems occurring in the prior art while advantages achieved by the prior art are maintained intact.

An aspect of the present disclosure provides a driver monitoring apparatus capable of improving reliability in monitoring a driver state by controlling an irradiation range and intensity of lighting depending on an operation mode and an external environment at the time of monitoring the driver state to irradiate light to only a region of interest, and a method for controlling an illuminator thereof.

According to an exemplary embodiment of the present disclosure, a driver monitoring apparatus includes: a driver monitoring camera configured to obtain an image of a user while adjusting an irradiation range of irradiated light; and a driver state sensor configured to request the driver monitoring camera to adjust the irradiation range depending on an operation mode.

The driver monitoring camera may include: an image sensor configured to obtain the image of the user; an illuminator configured to emit the irradiated light and variably adjust the irradiation range; and a controller configured to control operations of the image sensor and the illuminator.

The illuminator may include: a light source configured to emit light; a lens configured to collect the light emitted from the light source; and a driving unit configured to adjust a position of at least one of the light source and the lens.

The illuminator may further include a reflector configured to reflect transmitted light passing through the lens.

The illuminator may include: a light source configured to emit light; and a reflector configured to reflect the light emitted from the light source.

The illuminator may be implemented by an array in which one or more light sources are arrayed.

The illuminator may selectively turn on the one or more light sources.

The operation mode may be one of a face tracking mode and an eye tracking mode.

The driver state sensor may include: a face tracking module configured to extract face information from the image of the user; an eye tracking module configured to extract eye information from the image of the user; and a processing module configured to decide a state of a driver using the face information and the eye information.

According to another exemplary embodiment of the present disclosure, a method for controlling an illuminator of a driver monitoring apparatus includes: confirming an operation mode of the driver monitoring apparatus; determining an irradiation range of the illuminator provided in a camera depending on the operation mode; and adjusting an irradiation range of the illuminator depending on the determined irradiation range.

The operation mode may be one of a face tracking mode and an eye tracking mode.

In the determining of the irradiation range of the illuminator, it may be determined that a face region is the irradiation range when the operation mode is the face tracking mode.

In the determining of the irradiation range of the illuminator, it may be determined that an eye region is the irradiation range when the operation mode is not the eye tracking mode.

In the determining of the irradiation range of the illuminator, it may be determined that the irradiation range is a pupil region in the case in which lighting reflection by glasses is generated at the time of irradiating light to the eye region.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described in detail with reference to the accompanying drawings.

Figure 1:
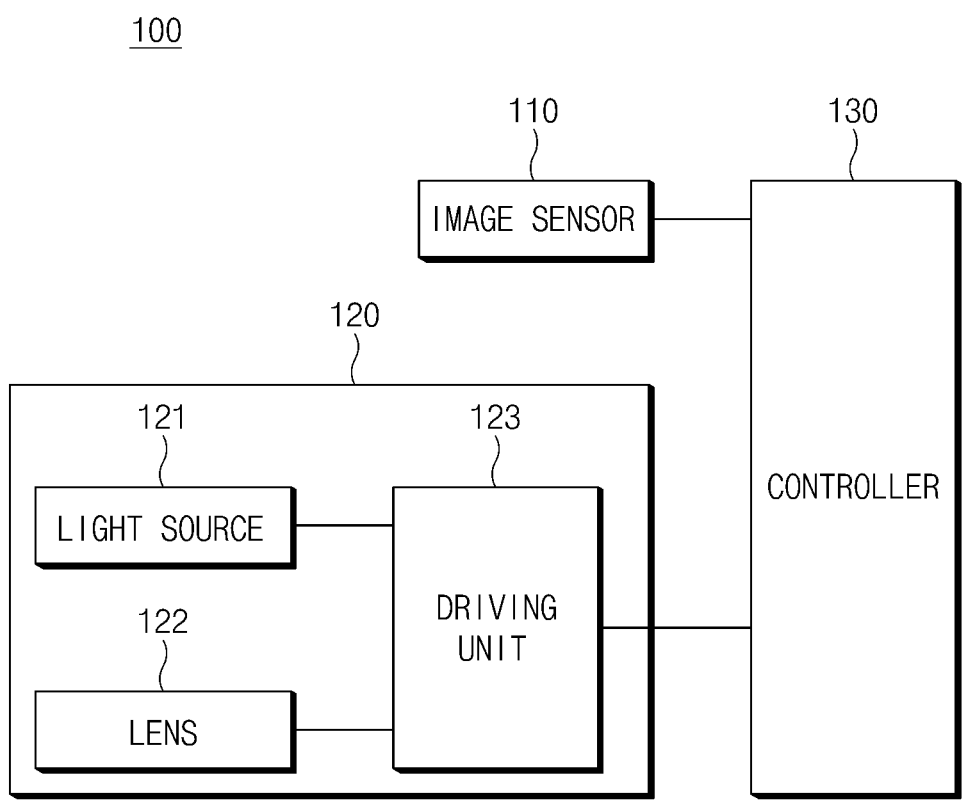
FIG. 1 is a block diagram of a driver monitoring camera according to an exemplary embodiment of the present disclosure.

FIG. 1 is a block diagram of a driver monitoring camera according to an exemplary embodiment of the present disclosure, and FIGS. 2A to 4B are illustrative views illustrating a configuration of an illuminator illustrated in FIG. 1.

As illustrated in FIG. 1, the driver monitoring camera 100 is configured to include an image sensor 110, an illuminator 120, and a controller 130.

The image sensor 110 serves to obtain an image of a user. For example, the image sensor 110 obtains an image of a face or an eye of the user. The image sensor 110 may be implemented as one or more image sensors such as a charge coupled device (CCD) image sensor, a complementary metal oxide semi-conductor (CMOS) image sensor, a charge priming device (CPD) image sensor, a charge injection device (CID) image sensor, an infrared image sensor, and the like.

The driver monitoring camera 100 may be configured of one or more image sensors. For example, the driver monitoring camera 100 may be implemented by a stereo camera.

The illuminator 120 is configured of one or more light sources 121. The light source 121 may be implemented by any one of a light emitting element, an infrared light emitting element, a lamp, a fluorescent lamp, a mercury lamp, and a sodium lamp.

Figure 2A:
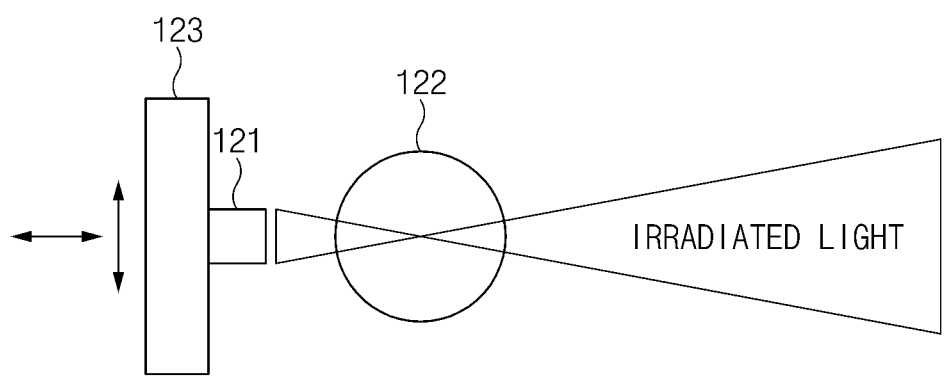
FIGS. 2A to 4B are illustrative views illustrating a configuration of an illuminator illustrated in FIG. 1.
Figure 2B:
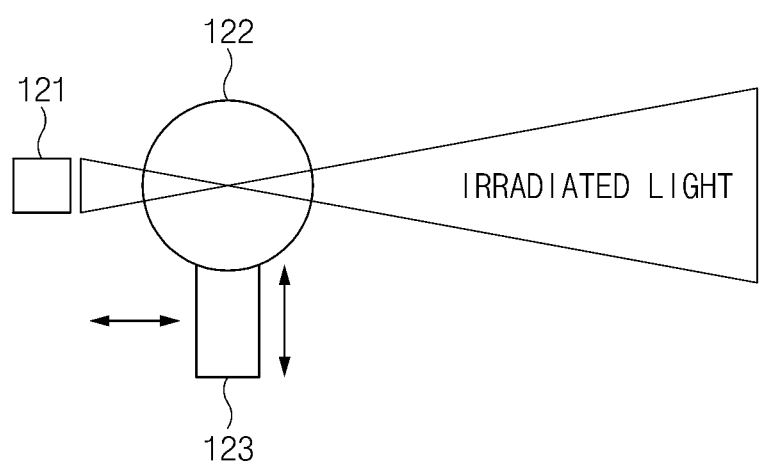

The illuminator 120 includes the light source 121 emitting light, a lens 122 collecting the light emitted from the light source 121, and a driving unit 123 adjusting positions of the light source 121 and/or the lens 122. As illustrated in FIGS. 2A and 2B, the driving unit 123 of the illuminator 120 may adjust the position of the light source 121 or control the position of the lens 122.

Figure 3A:
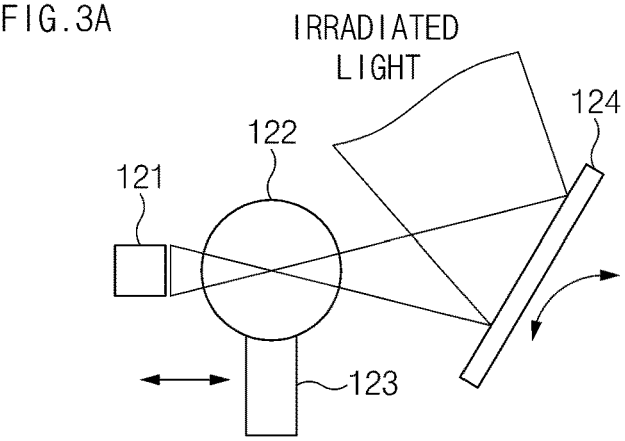
Figure 3B:
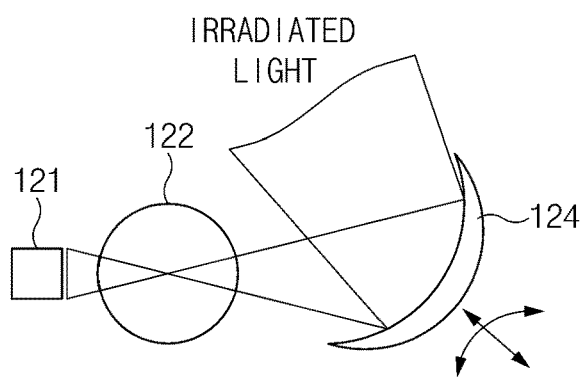
Figure 3C:
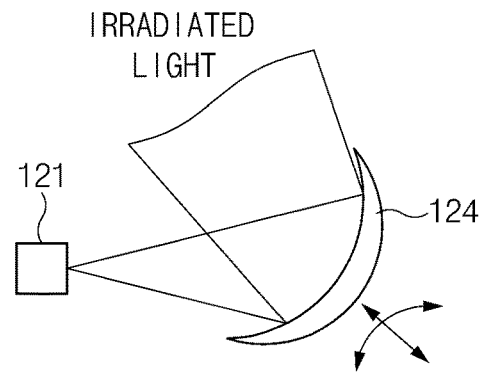

Meanwhile, the illuminator 120 may also include a reflector 124 reflecting transmitted light passing through the lens 122 in addition to the light source 121 and the lens 122, as illustrated in FIGS. 3A to 3C. Here, the driving unit 123 may be implemented so as to adjust a position and an angle of the reflector 124.

Meanwhile, the illuminator 120 may also be configured of the light source 121, the reflector 124, and the driving unit 123, as illustrated in FIG. 3C. Here, the driving unit 123 adjusts a position and an angle of the reflector 124.

Figure 4A:
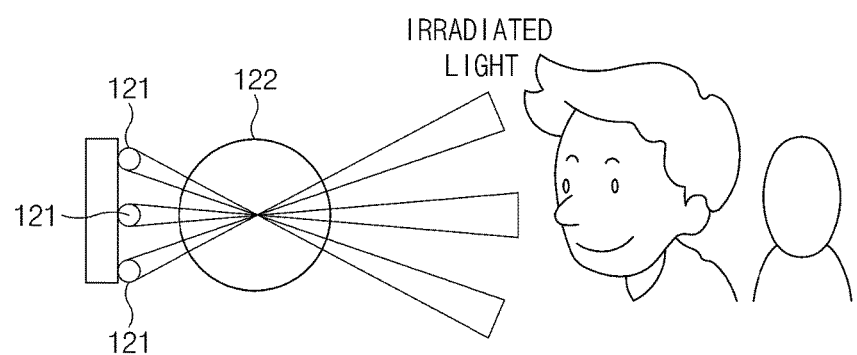
Figure 4B:
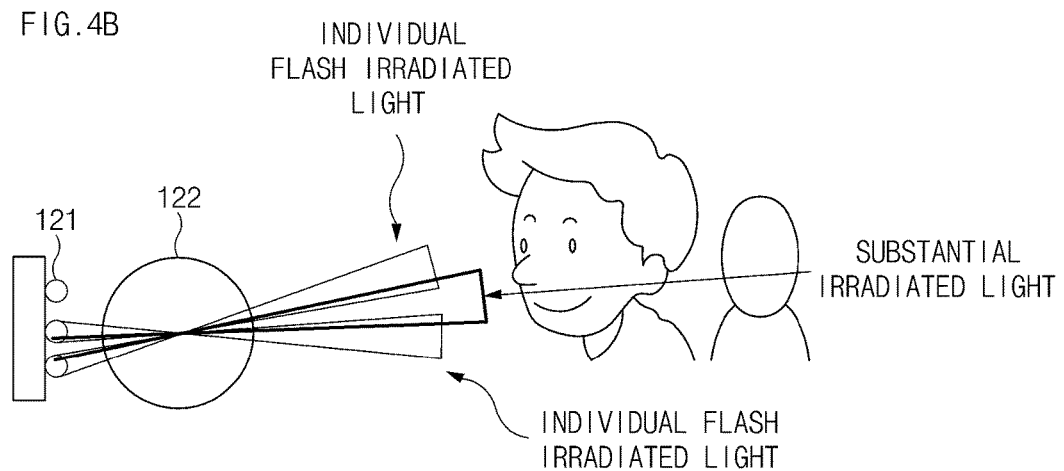

In addition, the illuminator 120 may be implemented by an array in which one or more light sources 121 are arrayed, as illustrated in FIGS. 4A and 4B. The illuminator 120 selectively turns on the one or more light sources 121 depending on an operation mode of a driver monitoring apparatus. The light sources 121 configuring the array need to be densely disposed in order to cover an entire face position at a narrow irradiation angle of an eye or a pupil using the array.

For example, as illustrated in FIG. 4A, irradiation ranges of the respective light sources 121 configuring the array are fixed. Here, in order to decrease the number of light sources 121 configuring the array, light may be irradiated to an angle between the respective light sources 121 using intensity interpolation between neighboring light sources 121, as illustrated in FIG. 4B.

The controller 130 controls operations of the image sensor 110 and the illuminator 120. The controller 130 controls the illuminator 120 depending on a request of the driver state sensor 200 to adjust an irradiation range (a size of an irradiation region) and irradiation intensity (light intensity).

Figure 5:
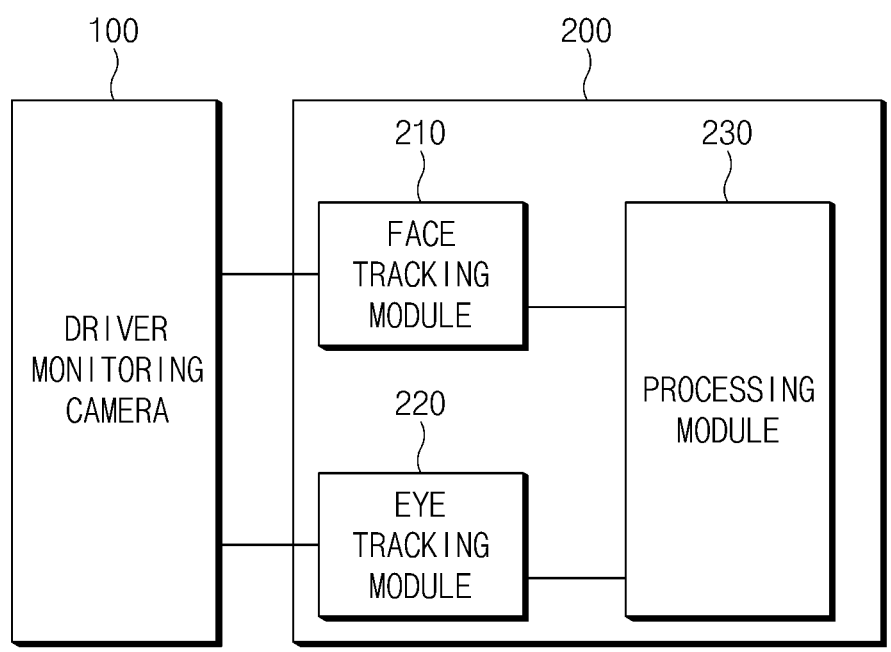
FIG. 5 is a block diagram illustrating a driver monitoring apparatus including the driver monitoring camera illustrated in FIG. 1.

FIG. 5 is a block diagram illustrating a driver monitoring apparatus including the driver monitoring camera illustrated in FIG. 1.

The driver monitoring apparatus is configured to include the driver monitoring camera 100 and a driver state sensor 200.

The driver monitoring camera 100 is operated in a face tracking mode or an eye (gaze) tracking mode depending on a request of the driver state sensor 200.

In the case in which the driver monitoring camera 100 is operated in the face tracking mode, it controls the illuminator 120 to irradiate light to a face region and obtain an image of the user through the image sensor 110.

Meanwhile, in the case in which the driver monitoring camera 100 is operated in the eye tracking mode, it determines that an irradiation range of the illuminator 120 is an eye region and obtains an image of the user through the image sensor 110. The driver monitoring camera 100 determines that the irradiation range is a pupil region when lighting reflection by glasses is generated at the time of irradiating the light to the eye region, and controls the driving unit 123 of the illuminator 120 to adjust the irradiation range.

The driver state sensor 200 outputs a control signal to the driver monitoring camera 100 to adjust the irradiation range of the illuminator 120. The driver state sensor 200 includes a face tracking module 210, an eye tracking module 220, and a processing module 230.

The face tracking module 210 detects a face of the user from the image of the user obtained through the driver monitoring camera 100 and tracks a direction, an angle, and the like, of the detected face.

The eye tracking module 220 extracts the eye region from the image of the user obtained through the driver monitoring camera 100 and detects a pupil and a lighting reflecting point in the extracted eye region. In addition, the eye tracking module 220 tracks a gaze using position information of the pupil and the lighting reflecting point. Here, in the case in which the lighting reflection is generated on the glasses worn by the user (driver), the eye tracking module 220 requests the driver monitoring camera 100 to decrease the irradiation range of the illuminator 120. The illuminator 120 controls the driving unit 123 to adjust positions of the light source 121 and/or the lens 122, thereby decreasing the irradiation range to a predetermined ratio (for example, a pupil region).

The processing module 230 confirms a state of the driver using face information and eye information (or gaze information) provided from the face tracking module 210 and/or the eye tracking module 220. In addition, the processing module 230 outputs an alarm as image and/or sound information depending on the state of the driver. The processing module 230 outputs the alarm (warning) through a display means and a sound output means (for example, a speaker). Here, the display means may include one or more of a liquid crystal display (LCD), a thin film transistor-liquid crystal display (TFT LCD), an organic light-emitting diode (OLED), a flexible display, a 3D display, a transparent display, a head-up display (HUD), and a touch screen.

Although the case in which the face tracking module 210 and the eye tracking module 220 are configured separately from the driver monitoring camera 100 has been described in the present exemplary embodiment, the present disclosure is not limited thereto. That is, the face tracking module 210 and the eye tracking module 220 may also be configured so as to be included in the driver monitoring camera 100.

Figure 6:
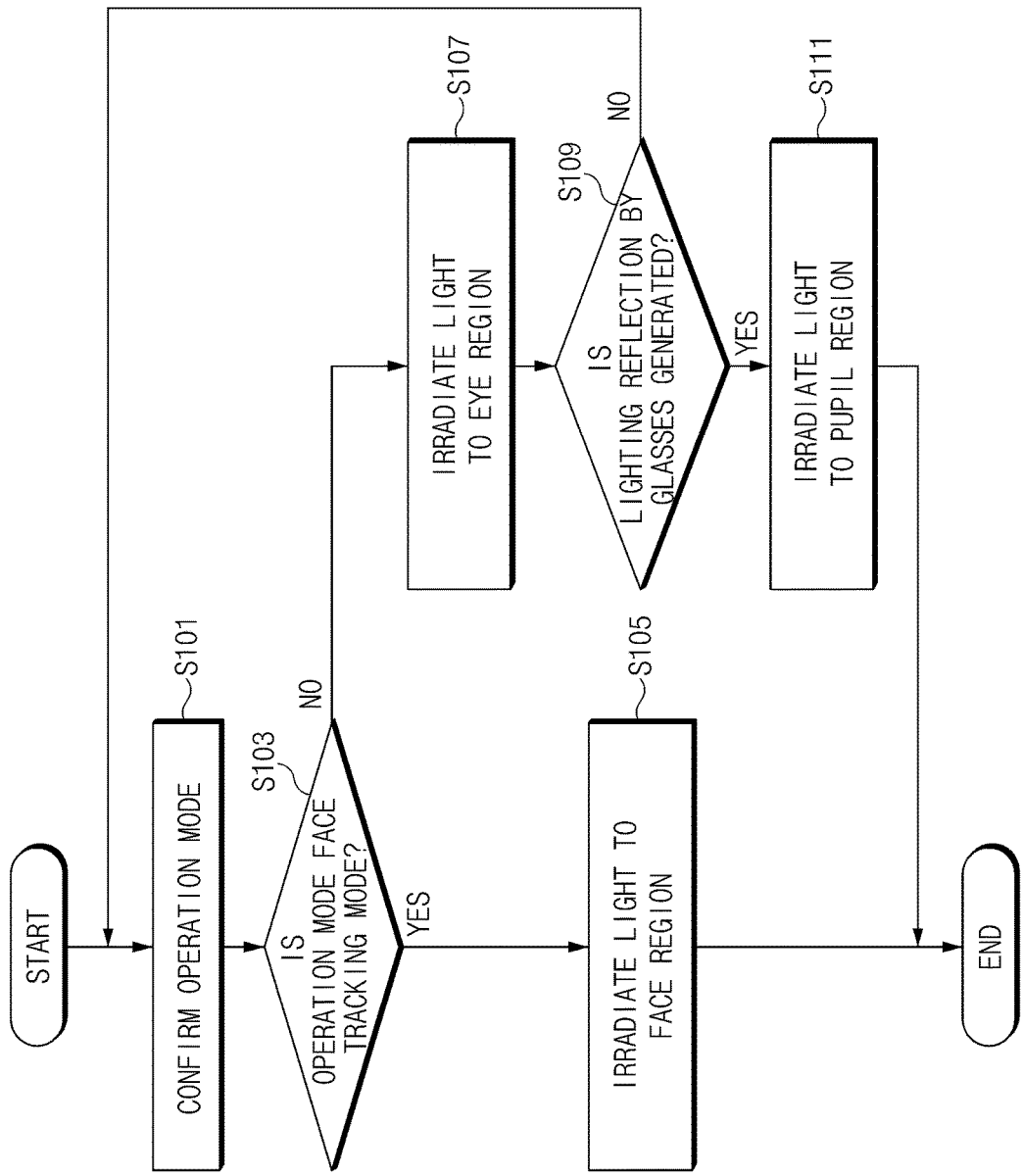
FIG. 6 is a flow chart showing a method for controlling an illuminator of the driving monitoring apparatus according to the exemplary embodiment of the present disclosure.

FIG. 6 is a flow chart showing a method for controlling an illuminator of the driving monitoring apparatus according to the exemplary embodiment of the present disclosure.

The driver monitoring camera 100 confirms an operation mode of the driver monitoring apparatus (S101). The driver monitoring camera 100 is operated in a face tracking mode and an eye (gaze) detecting mode depending on a request signal output from the driver state sensor 200. That is, the controller 130 of the driver monitoring camera 100 may confirm the operation mode of the driver monitoring apparatus based on the request signal of the driver state sensor 200.

The driver monitoring camera 100 determines that the face region is the irradiation range when the operation mode is the face tracking mode, and controls the illuminator 120 to irradiate the light to the face region (S103 and S105).

The driver monitoring camera 100 determines that the irradiation range is the eye region when the operation mode is not the face tracking mode, and controls the illuminator 120 to irradiate the light to the eye region (S107).

The driver monitoring camera 100 confirms whether the lighting reflection by the glasses is generated at the time of irradiating the light to the eye region (S109). That is, the eye tracking module 220 of the driver state sensor 200 confirms whether or not the driver (user) wears the glasses to inform the driver monitoring camera 100 whether or not the driver (user) wears the glasses.

The driver monitoring camera 100 determines the irradiation range is the pupil region in the case in which the lighting reflection by the glasses is generated, and controls the illuminator 120 to adjust (decrease) the irradiation range (S111).

Then, the driver state sensor 200 decides the state of the driver using the face information and the eye information (gaze information) obtained through the driver monitoring camera 100.

As described above, according to the exemplary embodiments of the present disclosure, the irradiation range and intensity of the illumination are controlled depending on the operation mode and an external environment at the time of monitoring the state of the driver to irradiate the light only to a region of interest, thereby making it possible to improve reliability in monitoring the state of the driver.

Although the case in which only the irradiation range is adjusted has been described in the present exemplary embodiment, the present disclosure is not limited thereto, but may also be implemented so that light intensity is adjusted.

What is claimed is:

1. A driver monitoring apparatus comprising:
a driver monitoring camera configured to obtain an image of a user while adjusting an irradiation range of irradiated light; and
a driver state sensor configured to request the driver monitoring camera to adjust the irradiation range to be either a face region or an eye region depending on whether an operation mode of the driver monitoring apparatus is either a face tracking mode or an eye tracking mode,
wherein, when a light reflecting point is detected in the obtained image of the user at a time of irradiating light to the eye region, the driver monitoring camera decreases the irradiation range to a predetermined ratio based on position information of a pupil.

2. The driver monitoring apparatus according to claim 1, wherein the driver monitoring camera includes:
an image sensor configured to obtain the image of the user;
an illuminator configured to emit the irradiated light and variably adjust the irradiation range; and
a controller configured to control operations of the image sensor and the illuminator.

3. The driver monitoring apparatus according to claim 2, wherein the illuminator includes:
a light source configured to emit light;
a lens configured to collect the light emitted from the light source; and
a driving unit configured to adjust a position of at least one of the light source and the lens.

4. The driver monitoring apparatus according to claim 3, wherein the illuminator further includes a reflector configured to reflect transmitted light passing through the lens.

5. The driver monitoring apparatus according to claim 2, wherein the illuminator includes:
a light source configured to emit light; and
a reflector configured to reflect the light emitted from the light source.

6. The driver monitoring apparatus according to claim 2, wherein the illuminator is implemented by an array in which one or more light sources are arrayed.

7. The driver monitoring apparatus according to claim 6, wherein the illuminator selectively turns on the one or more light sources.

8. The driver monitoring apparatus according to claim 1, wherein the driver state sensor is configured to:
extract face information from the image of the user;
extract eye information from the image of the user; and
decide a state of a driver using the face information and the eye information.

9. The driver monitoring apparatus according to claim 1, wherein the driver monitoring camera adjusts intensity of the irradiated light depending on the operation mode and an external environment.

\* \* \* \* \*